United States Patent [19]

Cullen et al.

[11] Patent Number: 5,092,914
[45] Date of Patent: Mar. 3, 1992

[54] FLOATABLE OXYGEN-ABSORBING CARTRIDGE

[75] Inventors: John S. Cullen, Buffalo; Samuel A. Incorvia, Tonawanda, both of N.Y.

[73] Assignee: Multiform Desiccants, Inc., Buffalo, N.Y.

[21] Appl. No.: 534,924

[22] Filed: Jun. 7, 1990

[51] Int. Cl.$^5$ ............................................. B01D 53/04
[52] U.S. Cl. ........................................ 55/316; 55/387; 55/389; 426/124
[58] Field of Search ................. 55/316, 387, 389; 426/124, 324, 398

[56] References Cited

U.S. PATENT DOCUMENTS

| | | | |
|---|---|---|---|
| 2,719,660 | 10/1955 | Ellis | 426/124 X |
| 2,825,651 | 3/1958 | Loo et al. | 426/124 X |
| 3,256,977 | 6/1966 | Pettersen | 426/124 X |
| 3,567,463 | 3/1971 | Williams | 426/124 |
| 3,722,188 | 3/1973 | Cullen | 55/387 X |
| 3,820,309 | 6/1974 | Cullen et al. | 55/387 |
| 3,854,912 | 12/1974 | Terrel et al. | 55/387 X |
| 4,113,652 | 9/1978 | Yashikawa et al. | 426/124 X |
| 4,173,656 | 11/1979 | Duggins | 426/124 X |
| 4,350,508 | 9/1982 | Santoro et al. | 55/387 X |
| 4,366,179 | 12/1982 | Nawata et al. | 426/124 X |
| 4,421,235 | 12/1983 | Moriya | 426/124 X |
| 4,510,162 | 4/1985 | Nezat | 426/124 |
| 4,536,409 | 8/1985 | Farrell et al. | 426/398 |
| 4,623,368 | 11/1986 | Lancesseur | 55/387 |
| 4,772,300 | 9/1988 | Cullen et al. | 55/387 |
| 4,783,206 | 11/1988 | Cullen et al. | 55/387 |

Primary Examiner—Robert Spitzer
Attorney, Agent, or Firm—Joseph P. Gastel

[57] ABSTRACT

A floatable oxygen-absorbing cartridge for placement into a container of liquid having an air space above the liquid level including a casing, a weighted base on the casing for causing the cartridge to float in an upright position with its upper portion above the level of the liquid, an oxygen-absorbing composition within the casing, and a permeable membrane on the upper portion of the casing exposed to the air space for permitting oxygen to pass therethrough to be absorbed by the oxygen-absorbing composition while preventing the passage of the liquid into the casing.

10 Claims, 1 Drawing Sheet

FLOATABLE OXYGEN-ABSORBING CARTRIDGE

BACKGROUND OF THE INVENTION

The present invention relates to a floatable oxygen-absorbing cartridge for placement into a liquid within a container for absorbing oxygen within the container above the liquid level.

By way of background, various types of liquids are marketed in containers having an air space above the liquid level. This air space contains normal air which includes the usual percentage of oxygen. This oxygen may deleteriously affect certain liquids by causing them to spoil prematurely, or at least alter the flavor thereof in an objectionable manner. Such liquids, by way of example, are milk and irradiated fruit juices, punches and the like. In the past, the oxygen was eliminated in certain types of packaging by being replaced with inert gases. However, this was generally costly.

SUMMARY OF THE INVENTION

It is the object of the present invention to provide a floatable oxygen-absorbing cartridge which may be inserted into a container for absorbing oxygen from the air space above the liquid level. Other objects and attendant advantages of the present invention will be perceived hereafter.

The present invention relates to a floatable oxygen-absorbing cartridge comprising casing means having a lower portion and an upper portion, said casing means being of a construction for causing said casing to float in a liquid in which it is immersed with said upper portion of said casing extending above the level of said liquid, oxygen-absorbing material in said casing, and membrane means on said upper portion of said casing which will pass oxygen for permitting oxygen to pass therethrough to said oxygen-absorbing material.

The present invention will be more fully understood when the following portions of the specification are read in conjunction with the accompanying drawings wherein:

DESCRIPTION OF THE PREFERRED EMBODIMENTS

Figure 1:
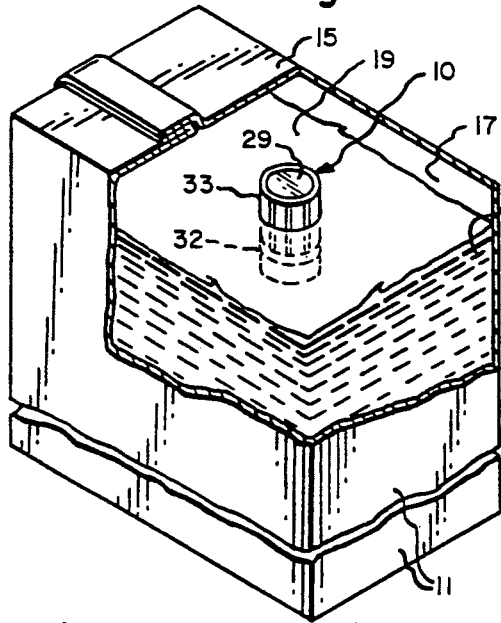
FIG. 1 is a fragmentary perspective view, partially broken away, of a rectangular container for irradiated fruit punch, or the like, having the floatable oxygen-absorbing cartridge therein.

The floatable oxygen-absorbing cartridge 10 of the present invention is intended to be placed in paper containers, such as 11 and 12, containing liquids 13 and 14, respectively. More specifically, container 11 is of substantially rectangular form and it contains a liquid 13 which is irradiated, and this liquid may be any suitable type of fruit juice, fruit punch or any other liquid which is conventionally packaged in container 11. Container 12 is of the type which usually contains milk, fruit juice, or any other liquid. Container 11 cannot be filled all the way to its top 15, and therefore there is an air space 17 above the level 19 of liquid 13. This air space 17 contains air which includes oxygen, and the oxygen may have a detrimental effect on the quality of the liquid 13. Container 12 contains an air space 20 above the level 21 of the liquid, and the oxygen in the air space may have a deleterious affect on the liquid 14. While only two types of containers have been disclosed, it will be appreciated that the oxygen-absorbing cartridge 10 of the present invention can be used in any type of container.

Figures 3, 4, 5:
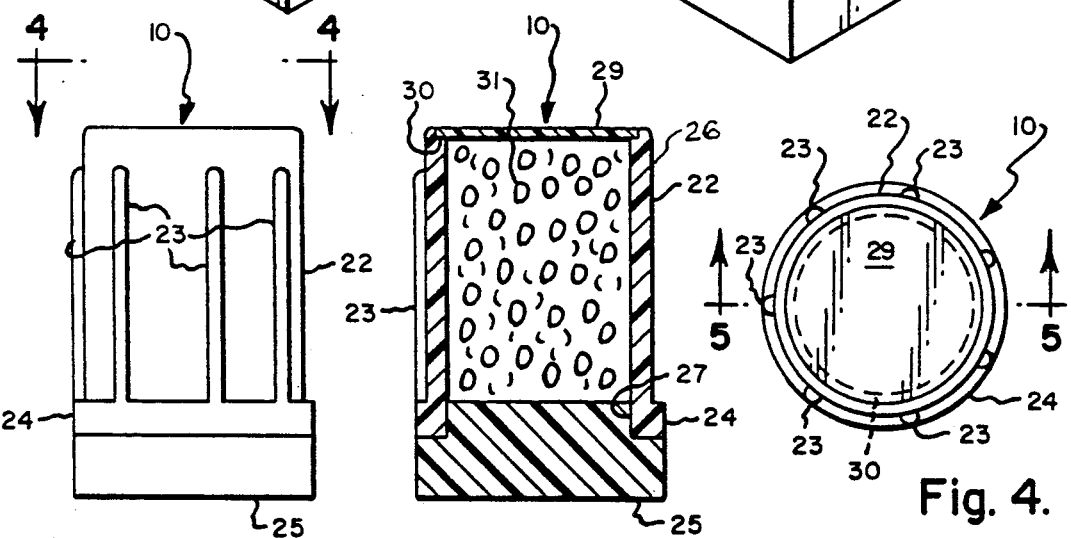
FIG. 3 is an enlarged side elevational view of the floatable oxygen-absorbing cartridge of the present invention.
FIG. 4 is a view taken substantially in the direction of arrows 4—4 of FIG. 3.
FIG. 5 is a cross sectional view taken substantially along line 5—5 of FIG. 4.

The floatable oxygen-absorbing cartridge 10 is disclosed in FIGS. 3-5. It includes a casing 22 having a hollow polyethylene portion 26 of generally cylindrical form having a plurality of ribs 23 molded integrally therewith which terminate at integrally molded rim 24. The casing 22 also includes a base 25 of an acetal plastic known under the registered trademark DELRIN, in the form of a plug, which is inserted into opening 27 with a tight fit. Suitable adhesive may be used at the junction. A permeable membrane 29 of circular shape has its outer edge resting on annular ledge 30 at the upper portion of casing portion 26. Permeable membrane, which is preferably fabricated from a spun-bonded polyolefin known under the registered trademark TYVEK, is fused to ledge 30 by heat and pressure. Membrane 30 will pass gases but not liquids. It will be appreciated that other permeable membranes can also be used, including polyethylene.

Contained within casing 22 is an oxygen-absorbing mixture 31 consisting of iron filings and silica gel which is impregnated with a sodium chloride solution. The iron filings in the presence of the sodium chloride electrolyte will attract the oxygen in the upper portions 17 and 20 of containers 11 and 12.

Figure 2:
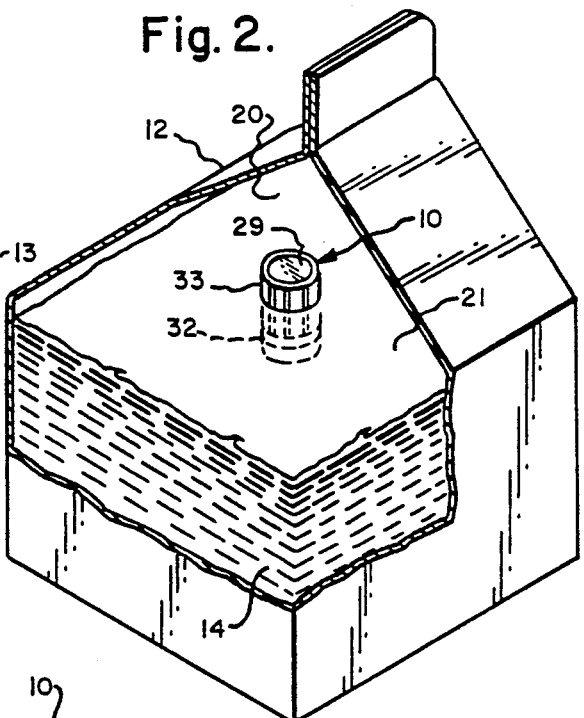
FIG. 2 is a perspective view, partially broken away, of a type of container having a triangular top for milk or another type of liquid and having the floatable oxygen-absorbing cartridge therein.

In accordance with the present invention, the DELRIN base 25, which is heavier than the liquid within a container, will cause the oxygen-absorbing cartridge 10 to float in an upright position, as depicted in FIGS. 1 and 2, with the lower portion 32 below the level of the liquid and the upper portion 33 above the level of the liquid. Thus, the permeable membrane 29 is in direct contact with the air in the space above the liquid level. Even when the containers 11 and 12 are tilted or turned upside down, the oxygen-absorbing cartridge 10 will always rise to the top of the liquid with the upper portion 33 thereof exposed. Furthermore, since the permeable membrane 29 will not pass liquids but only pass gases, even though it may be wetted, the liquid will not pass through the permeable membrane. Also, the permeable membrane 29 will not permit the contents 31 to be deposited into the liquid.

The base 25, which is of a greater specific gravity than the liquid, may be made of different sizes to compensate for different specific gravities of the liquid in which the oxygen-absorbing cartridge 22 is to be located. More specifically, if the liquid has a greater specific gravity, a larger base 25 can be used and if it is to be located in a lighter liquid, a smaller base 25 will be used. The criterion is that the base 25 should be sufficiently large so that the oxygen-absorbing cartridge 10 will float in the manner depicted in FIGS. 1 and 2.

In a specific sample which was fabricated, the casing portion 22 including rim 24 was 11/16 inches long and had an internal diameter of 5/16 of an inch. The base 25 including the portion within casing 22 was approximately ¼ of an inch long and the outer diameter was approximately ½ inch. Cartridge 10 contained a total weight of about 0.5 grams of the oxygen-absorbing mixture 31. At the time of fabrication, it contained by weight about 29% of iron particles of a size of about 100 mesh, about 10% of dry silica gel having a particle size of between about 30 mesh and 200 mesh and wherein about 98% was retained at 200 mesh, and about 61% of electrolyte impregnated silica gel having a particle size of between about 30 mesh and 200 mesh and wherein about 98% was retained at 200 mesh and having a 6% of sodium chloride solution therein in an amount of about 36% of the foregoing 61%. The TYVEK was of the grade identified as 1059B. The use of 10% of dry silica gel is for the purpose of improving the handleability of the mixture so that it will not lose its potency as a result of exposure to the atmosphere prior to filling casing 22 and prior to packaging in a hermetically sealed container. In this respect, the dry silica gel is a water attracting composition which has an affinity for water from the impregnated silica gel and from the atmosphere and it will thus delay the reaction of the iron with the electrolyte to absorb oxygen until the dry silica gel is sufficiently saturated with water to permit the reaction to proceed. It will be appreciated that the above parameters are by way of example and not of limitation, and that the above parameters may be changed to meet different requirements.

As noted above, the oxygen-attracting component is preferably iron in particle or powder form but may be any other metal or substance suitable of attracting and combining with oxygen. The oxygen attracting component may be, by way of example and not of limitation, other compounds of iron or other metals or compounds thereof, such as aluminum, zinc, nickel, copper, manganese, iron sulfide, iron oxide, iron hydroxide or other metals or compounds. The metals or compounds may be used by themselves or in combination.

The oxygen-attracting component may be present in an amount of between about 10% and 75% by weight and preferably between about 15% and 55% by weight and most preferably between about 20% and 40% by weight. The oxygen-attracting component may have a particle size of between about 40 mesh and 325 mesh and more preferably between about 75 mesh and 325 mesh and most preferably between about 100 mesh and 325 mesh. In fact, it may be of any suitable particle size.

The electrolyte-impregnated composition includes a carrier for the electrolyte which is preferably a silica gel but it may be any other composition, by way of example and not of limitation, such as bentonite, activated carbon, silica, alumina, or zeolite, or any other suitable compound. This electrolyte-impregnated composition, or mixtures thereof, may be of a particle size of between about 10 mesh and 300 mesh, and more preferably between about 20 mesh and 250 mesh, and most preferably between about 40 mesh and 200 mesh. In fact, it may be of any suitable particle size. The fact that the carrier for the electrolyte has a water-absorbing characteristic also aids in keeping the water away from the oxygen-absorbing component.

The electrolyte is preferably an aqueous sodium chloride solution. However, it may also be any other suitable salt solution which, by way of example and not of limitation, may include a salt such as ammonium chloride, ammonium sulfate, or other sodium, or potassium or ammonium halide salts. The aqueous sodium chloride solution may have a concentration of between about 1% and 14% of sodium chloride by weight, and more preferably between about 1% and 8% of sodium chloride by weight, and most preferably between about 1% and 6% of sodium chloride by weight. In fact, any suitable concentration may be used. Analogous percentages of the other salts may be used.

The electrolyte solution as a percentage of the total weight of the electrolyte-impregnated composition may be between about 5% and 42%, and more preferably between about 10% and 40%, and most preferably between about 20% and 38%.

The electrolyte impregnated composition, as noted above, forms one component of the composition, and may be present in an amount of between about 5% and 85% by weight, and more preferably between about 30% and 75% by weight, and most preferably between about 50% and 70% by weight. In fact, it may be present in any suitable amount.

The water-attracting composition is preferably a silica gel but it may be any other composition, by way of example and not of limitation, such as bentonite, activated carbon, silica, alumina, or zeolite, or any other suitable compound. This electrolyte-impregnated composition, or mixtures thereof, may be of a particle size of between about 10 mesh and 300 mesh, and more preferably between about 20 mesh and 250 mesh, and most preferably between about 40 mesh and 200 mesh. In fact, it may be of any suitable particle size.

The water-attracting composition, which is preferably dry silica gel as noted above, is as dry as possible and at the time of formulation should preferably not contain more than 2% of water by weight. This component can also be present in the amount of between 5% and 20% by weight, and more preferably between about 7% and 15% by weight, and most preferably between about 8% and 14% by weight. In fact, it may be present in any suitable amount.

In the preparation of the final composition, the proper proportion of silica gel is impregnated with the electrolyte solution to form the aqueous electrolyte-carrying component. Thereafter, the aqueous electrolyte-carrying component, the oxygen-attracting component and water-attracting component are mixed shortly before placement into the casing 22 so that as little time as possible elapses before filling the casings. In the composition the water-attracting component has a greater affinity for the electrolytic solution than does the oxygen-attracting component, and it will therefore prevent the electrolyte from appreciably combining with the oxygen-attracting component and thus prevent it from absorbing oxygen from the air. Furthermore, the normal relative humidity of the environment is between about 30% and 70%, and the water-attracting component will have a greater affinity for water vapor from the air than does the oxygen-attracting component. Accordingly, electrolytic action cannot occur to cause the oxygen-attracting component to combine with the oxygen in the air. The foregoing is relatively significant in that it permits the composition to be formulated under normal environmental and atmospheric conditions without premature oxidation of the oxygen-attracting component.

It has been found that the composition which has been prepared in accordance with the preferred procedure can be exposed to the air for up to 36 hours at relative humidities below about 70% without appreciable oxidation. Above about 70% relative humidity, the time for appreciable oxidation is reduced. If mixed according to the other procedures, the time for oxidation is less. The composition, during the time that it is thus exposed to the atmosphere for the foregoing period, can be packaged into separate casings 22 as described above. Thereafter, the cartridges 10 are placed in hermetically sealed containers for shipment to food processors or the like. The amount of oxygen in the hermetically sealed containers is not significant and thus there will practically be no oxidation of the oxygen-absorbing component. Thus, the cartridges can have an almost indefinite shelf life while hermetically sealed within their storage or shipping containers. During the time of storage, the amount of water will tend to equalize between the electrolyte-impregnated composition and the water-attracting composition. However, during this period of storage there is no oxygen present so that the oxygen-attracting component cannot oxidize, and thus it retains its potency.

After the cartridges 10 are removed from their hermetically sealed containers, they are exposed to atmospheric oxygen. However, at this time the normal atmospheric relative humidity is between about 30% and 70% so that there is no appreciable oxidation of the oxygen-attracting component because the water and water vapor absorbing components are still sufficiently dry so that they tend to keep the electrolyte away from the metal for a reasonable period of time required to place the packets in their ultimate food containers from which they are to absorb oxygen to prevent deterioration of the food product.

After one of the cartridges 10 has been placed in a subsequently sealed container of a liquid, it will over a period of time absorb the oxygen within the container and this absorption is enhanced by the fact that the relative humidity within the food container is approximately 100%, which enhances the activity of the electrolyte to thereby cause the oxygen-absorbing component to absorb the oxygen from the container and thus prevent it from deteriorating the food product.

Figure 6:
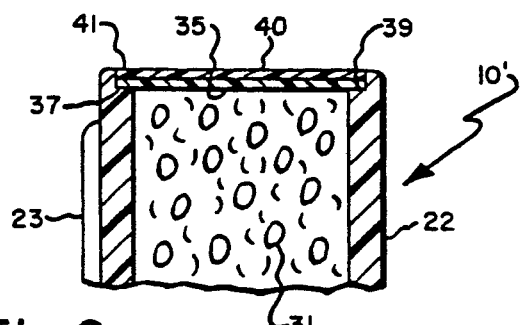
FIG. 6 is a fragmentary cross sectional view, similar to FIG. 5, but showing a modified embodiment of the present invention having two permeable membranes on the upper portion thereof.

In FIG. 6 a further embodiment of the present invention is disclosed. The oxygen-absorbing cartridge 10' includes a casing 22 which is identical to that of the preceding figures, and it also contains the oxygen-absorbing mixture 31. The only way it differs from the embodiment of FIGS. 3–5 is that it has two permeable membranes thereon. The lower membrane 35 may be the TYVEK discussed above, and it has an outer edge 37 which rests on annular ledge 39. In addition, a permeable membrane 40 is superimposed on membrane 35, and membrane 40 may be made of permeable polyethylene which protects the membrane 35 but permits gases to pass therethrough. The edge 41 of membrane 40 also overlies ledge 39. Membranes 35 and 40 are fused to each other at ledge 39, and membrane 35 is fused to ledge 39 by suitable heat and pressure.

Figure 7:
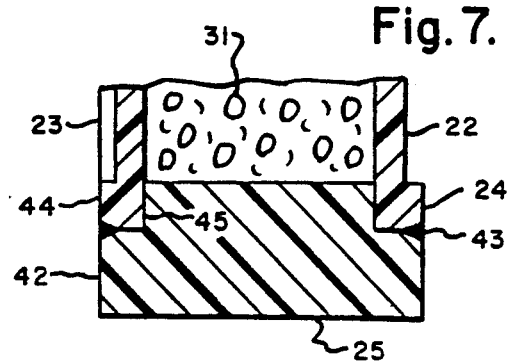
FIG. 7 is a fragmentary cross sectional view similar to FIG. 5 and showing another embodiment of the present invention.

In FIG. 7 a further embodiment of the present invention is disclosed. In this embodiment casing 22 is identical to the above described casings. Base 25 is also identical. In the embodiment of FIG. 7, the annular junction between rim 24 and the outer surface 42 of base 25 is fused at 43 by suitable heat to seal base 25 to rim 24. If desired, heat and pressure can be applied to rim 24 at 44 to effect a sealed joint at the annular junction 45 between the inner portion of rim 24 and the adjacent portion of base 25.

While the floatable oxygen-absorbing cartridge has been disclosed as being substantially cylindrical in shape, it will be appreciated that it can be of any other desired shape which will cause it to float with an upper portion exposed above the level of the liquid to absorb oxygen. It will also be appreciated that while the mixture 31 which was described above was strictly for the purpose of absorbing oxygen, compositions for absorbing other types of gases from above the level of a liquid within a closed container can be equally utilized within the teachings of the present invention. Also, it will be appreciated that oxygen-absorbing compositions which are different than those specifically described above may be used.

While the specific embodiments disclosed above have shown a separate casing portion 26 and a separate base or plug 25, it will be appreciated that the casing 22 can be molded in a single piece with an integral base or bottom. If the material has a lower specific gravity than the liquid into which it is to be placed, suitable weights may be secured to the inside of the casing proximate the base to cause it to function in the same manner as described above relative to the drawings. If the material has a greater specific gravity than the liquid, it can be engineered to have a displacement in the liquid which will cause it to float in the manner described above relative to the drawings.

It will also be appreciated that the floatable oxygen-absorbing cartridge can be used with any type of liquid which will be deleteriously affected by oxygen, such as red wine in a partially empty bottle or possibly even beer. Also, the cartridge 10 will absorb any oxygen which may migrate through the package into the air space above the liquid.

While the above specification has referred to the absorbing of oxygen, the cartridge can additionally contain other compounds for absorbing other gases including those which may be generated by the liquid itself. Alternatively, it can contain compounds for absorbing gases other than oxygen where this may be required.

While preferred embodiments of the present invention have been disclosed, it will be appreciated that it is not limited thereto but may be otherwise embodied within the scope of the following claims.

What is claimed is:

1. A floatable oxygen-absorbing cartridge comprising a liquid impermeable casing having a lower portion and an upper portion, oxygen-absorbing material in said casing, means on said casing for causing said casing to float upright in liquid in which it is placed with said upper portion of said upright casing extending above the level of said liquid, and membrane means sealed in liquid-tight relationship on said upper portion of said casing and located on said upper portion of said casing so as to be positioned entirely above the level of said liquid when said casing is floating in said liquid, said membrane means being capable of passing oxygen but not a liquid to thereby permit oxygen to pass therethrough to said oxygen-absorbing material while preventing the passage of liquid.

2. A floatable oxygen-absorbing cartridge as set froth in claim 1 including a base on said lower portion of said casing having a greater specific gravity than the liquid in which said oxygen-absorbing cartridge is immersed to cause said casing to float in an upright attitude.

3. A floatable oxygen-absorbing cartridge as set forth in claim 2 wherein said base is of a different material than the remainder of said casing.

4. A floatable oxygen-absorbing cartridge as set forth in claim 3 wherein said base is sealed to an adjacent portion of said remainder of said casing.

5. A floatable gas-absorbing cartridge for absorbing a gas from the space in a closed container above the level of liquid therein comprising a liquid impermeable casing having a lower portion and an upper portion, a gas-absorbing material in said casing, means on said casing for causing said casing to float upright in liquid in which it is placed with said upper portion of said upright casing extending above the level of said liquid, and membrane means sealed in liquid-tight relationship on said upper portion of said casing and located on said upper portion of said casing so as to be positioned entirely above the level of said liquid when said casing is floating in said liquid, said membrane means being capable of passing a gas but not a liquid for permitting gas to pass therethrough to said gas-absorbing material while preventing the passage of liquid.

6. In a closed container having liquid therein which may be deleteriously affected by a gas above the liquid, a floatable oxygen-absorbing cartridge comprising a liquid impermeable casing having a lower portion and an upper portion, gas-absorbing material in said casing, means on said casing for causing said casing to float upright in liquid in which it is placed with said upper portion of said casing extending above the level of said liquid, and membrane means sealed in liquid-tight relationship on said upper portion of said casing and located on said upper portion of said casing so as to be positioned entirely above the level of said liquid when said casing is floating in said liquid, said membrane means being capable of passing a gas but not a liquid for permitting said gas to pass therethrough to said gas-absorbing material while preventing the passage of liquid.

7. A floatable oxygen-absorbing cartridge comprising casing means having a lower portion and an upper portion, said casing means being of a construction for causing said casing to float upright in a liquid in which it is placed with said upper portion of said upright casing extending above the level of said liquid, oxygen-absorbing material in said casing, and membrane means sealed in liquid-tight relationship on said upper portion of said casing and located on said upper portion of said casing so as to be positioned entirely above the level of said liquid when said casing is floating in said liquid, said membrane means being capable of passing oxygen for permitting oxygen to pass therethrough to said oxygen-absorbing material.

8. A floatable oxygen-absorbing cartridge as set forth in claim 7 wherein at least said lower portion of said casing is impermeable to said liquid.

9. A floatable oxygen-absorbing cartridge as set forth in claim 7 wherein said membrane means is impermeable to said liquid.

10. A floatable oxygen-absorbing cartridge as set forth in claim 9 wherein at least said lower portion of said casing is impermeable to said liquid.

* * * * *